(12) United States Patent  
Savvides et al.

(10) Patent No.: US 9,336,439 B2  
(45) Date of Patent: May 10, 2016

(54) SYSTEM AND METHOD FOR THE LONG RANGE ACQUISITION OF IRIS IMAGES FROM STATIONARY AND MOBILE SUBJECTS

(71) Applicant: Carnegie Mellon University, Pittsburgh, PA (US)

(72) Inventors: Marios Savvides, Wexford, PA (US); Shreyas Venugopalan, Pittsburgh, PA (US); Douglas Toomey, Hakalau, HI (US); Unni Prasad, San Diego, CA (US); Kahlid Harun, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/347,106

(22) PCT Filed: Oct. 12, 2012

(86) PCT No.: PCT/US2012/059884  
§ 371 (c)(1),  
(2) Date: Mar. 25, 2014

(87) PCT Pub. No.: WO2013/056001  
PCT Pub. Date: Apr. 18, 2013

(65) Prior Publication Data  
US 2014/0226876 A1     Aug. 14, 2014

Related U.S. Application Data

(60) Provisional application No. 61/627,432, filed on Oct. 12, 2011.

(51) Int. Cl.  
*G06K 9/00* (2006.01)  
*A61B 3/14* (2006.01)  
*H04N 9/47* (2006.01)  
*H04N 5/225* (2006.01)

(52) U.S. Cl.  
CPC .................. *G06K 9/00604* (2013.01)

(58) Field of Classification Search  
CPC .. H04N 7/18; G06K 9/00255; G06K 9/00604  
USPC ............ 382/100, 118, 103, 115, 117; 348/77, 348/88, 78, 362, 355, 363, 370, 207.99; 351/200, 205, 206, 246, 208, 210, 209, 351/221; 396/18; 250/200; 352/140  
See application file for complete search history.

(56) References Cited

U.S. PATENT DOCUMENTS

| | | | | |
|---|---|---|---|---|
| 7,095,901 | B2 * | 8/2006 | Lee et al. | 382/255 |
| 7,643,659 | B2 * | 1/2010 | Cao et al. | 382/118 |
| 7,805,009 | B2 * | 9/2010 | Everett et al. | 382/218 |
| 7,869,627 | B2 * | 1/2011 | Northcott et al. | 382/117 |
| 8,121,356 | B2 * | 2/2012 | Friedman et al. | 382/115 |

(Continued)

FOREIGN PATENT DOCUMENTS

WO    WO 2009036103 A1    3/2009

*Primary Examiner* — Sheela C Chawan  
(74) *Attorney, Agent, or Firm* — Fox Rothschild LLP; Dennis M. Carleton

(57) ABSTRACT

Described is a system which is capable of capturing images of the iris up to distances of 11 meters with a resolution of 150-200 pixels across the diameter. The system incorporates velocity estimation and focus tracking modules such that that images may be acquired from moving subjects.

22 Claims, 10 Drawing Sheets

(56) References Cited

U.S. PATENT DOCUMENTS

| | | | |
|---|---|---|---|
| 8,144,960 B2 * | 3/2012 | Winther | 382/130 |
| 8,203,602 B2 * | 6/2012 | Ren et al. | 348/78 |
| 2008/0044063 A1 | 2/2008 | Friedman et al. | |
| 2008/0069411 A1 | 3/2008 | Friedman et al. | |
| 2008/0253622 A1 | 10/2008 | Tosa et al. | |
| 2010/0290668 A1 | 11/2010 | Friedman et al. | |
| 2011/0109764 A1 * | 5/2011 | Hong | 348/222.1 |

\* cited by examiner (a)

(b)

SYSTEM AND METHOD FOR THE LONG RANGE ACQUISITION OF IRIS IMAGES FROM STATIONARY AND MOBILE SUBJECTS

RELATED APPLICATIONS

This application is a national stage filing under 35 U.S.C. §371 of PCT application PCT/US12/59884, filed Oct. 12, 2012, which claims priority to U.S. Provisional Application Ser. No. 61/627,432, filed Oct. 12, 2011.

BACKGROUND OF THE INVENTION

Iris pattern-based biometric systems, for both surveillance and access control have been gaining popularity in recent years. Several such systems have already been deployed in highly secure checkpoints across the globe. The primary advantage of such systems is the uniqueness of iridal patterns across people. Over the years, many works in scientific literature have proposed feature extraction and comparison schemes for this biometric and have reported very high recognition rates.

In all iris pattern-based biometric systems, a major concern is the acquisition of very well focused eye images in which relevant iris features are discernible. The acquisition process often requires significant cooperation from the subject whose eye is being imaged. For instance, the subject may be required to be positioned at a pre-defined location, at a pre-defined distance from the camera and sufficient near infra-red (NIR) illumination must be provided for acquisition. The need for such cooperation is due to the limited capture volume of these systems. The capture volume is the volume of space in front of the image acquisition system within which the subject's iris is of acceptable quality. Once the iris of the subject is within this volume, the subject typically remains in a fixed position, with limited motion, until the system acquires a good quality image. An example of a widely used commercial iris acquisition device is the LG IrisAccess 4000. This system uses voice prompts to direct the subject into the capture volume. In general, with such systems, the positioning process can seem counter intuitive for some subjects and can result in failure to acquire errors.

Other systems that have been proposed involve less cooperation from the subjects. A good example is the Iris-On-the-Move system, developed by Sarnoff Corporation. In this system, iris patterns are captured while the subject walks through a portal fitted with NIR illumination panels. The subject stand-off required by the system is 3 meters. This acquisition system is a fixed focus system with a reported narrow depth of field of 5 cm. Compared to traditional desktop/wall mount systems (such as those marketed by Panasonic, LG and others), this system has the advantage of an increased stand-off distance and reduced level of cooperation from the subject. However, iris acquisition fails if a subject's iris is not acquired through a fixed, small capture volume. This system uses a modular approach to increase the height of the capture volume, in which multiple cameras are stacked one above the other so that the iris can be captured irrespective of the height of the subject. The extra hardware and custom lenses increase the cost of the system.

Another category of acquisition systems involves the use of cameras which can be panned, tilted and zoomed. These cameras alleviate the constraint of a fixed capture volume. These systems are based on the use of multiple cameras—a first, wide angle scene camera to detect the face/eye in the scene and a second camera with a high magnification lens, specifically aimed to resolve the fine patterns in the iris. Depth estimation is performed using a stereo-camera setup. This information helps in estimating the position of the subject in 3D space and hence the focus and pan/tilt settings.

Yet another system uses a commercial off the shelf pan/tilt/zoom camera to track the faces of subject and to acquire irises when the subject is still. The subject's irises may be acquired from stand-off distances of up to 1.5 meters. This system uses a single camera setup to acquire both the face and iris from subjects of different heights. The Retica Eagle Eye system uses a scene camera, a face camera, and two iris cameras, which account for its large form factor. The capture volume of this system is larger compared to the systems described so far, yielding a 3 m×2 m×3 m capture volume, with increased stand-off (average of 5 m).

SUMMARY OF THE INVENTION

Set forth herein is a novel long range iris acquisition system that has been designed and developed to acquire pristine quality iris images from stand-off distances of up to 12 m from stationary or mobile subjects. The range of the system will be greater than those existing in the prior art. In addition, as the described system uses commercial, off the shelf (COTS) equipment, the cost of the system will be relatively low compared to similar systems that employ several custom made devices.

The system also features the ability to have the illumination panel and the imaging sensor co-located. This facilitates a setup that may be deployed quickly to any location without concerns about the illumination on the subject's side.

The pixel resolution of the acquired iris will consistently be greater than 150 pixels across the diameter. The system acquires both the face and the iris using a single camera. To track mobile subjects, an area scan camera has been incorporated, in addition to the high resolution biometric imager. The function of this camera is to track the subject during the subject's motion and to keep the face of the subject centered in the frame of the high resolution imager (which captures both the face and the iris with the required resolution).

The captured iridal patterns of the subject may be compared against an existing database to determine whether the subject can be identified. For mobile subjects, the system can capture acceptable iridal patterns at walking speeds of up to 0.6 m/s.

DETAILED DESCRIPTION OF THE INVENTION

Figure 1:
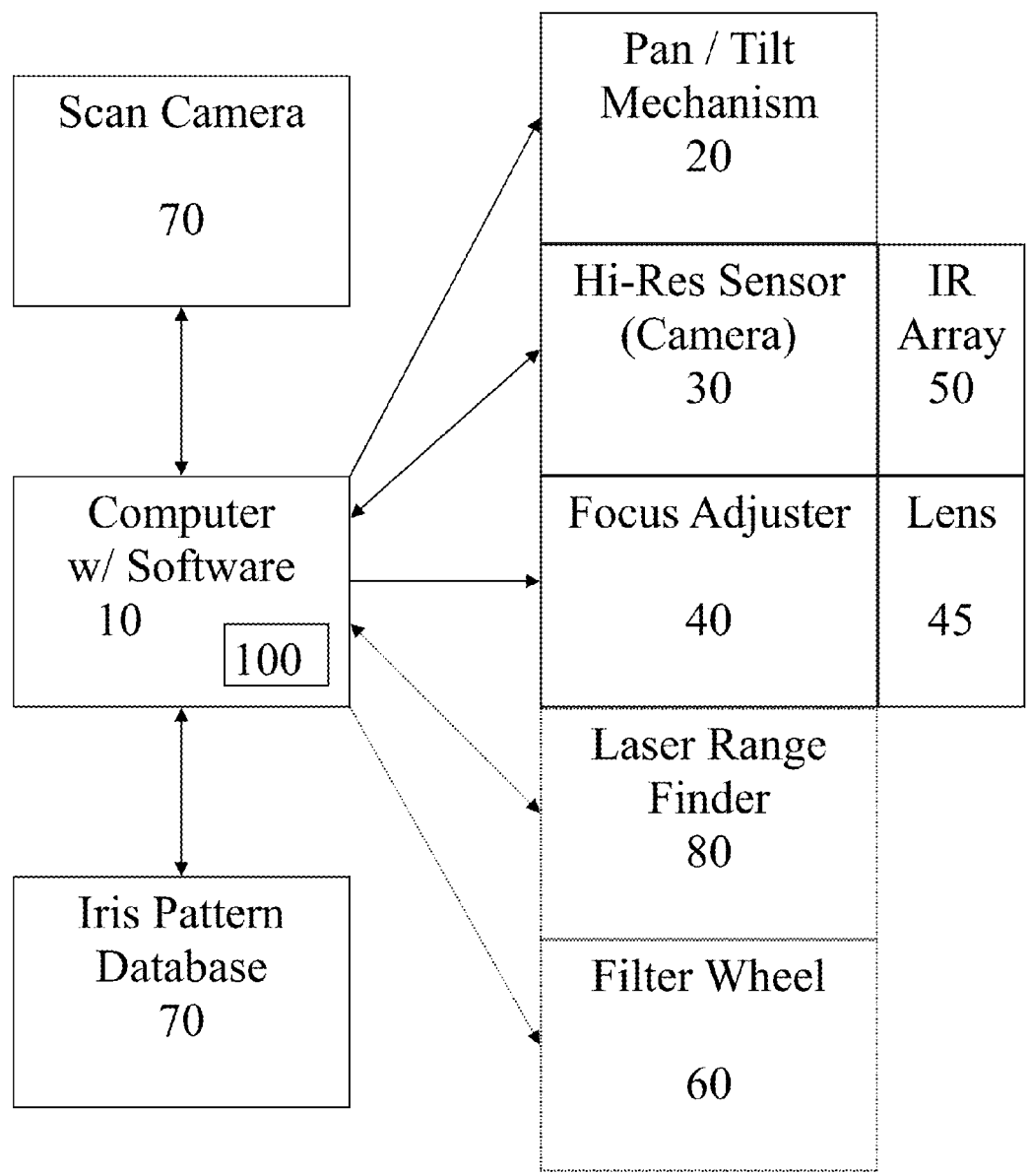
FIG. 1. is a block diagram of the hardware components of the system.

The system, as shown in FIG. 1, includes commercial, off-the-shelf hardware components which include an imaging sensor 30 (camera), a high magnification telephoto lens 45 equipped with a focus adjustment module 40, a source of infra-red lighting 50, a pan/tilt mechanism 20 and, in some embodiments, a filter wheel 60 and scan camera 70. The system is controlled by software 100 running on a standard PC 10 or other computing platform, which includes components to perform focus estimation, subject speed estimation, focal length adjustment, image acquisition and image recognition and matching.

The optics used in the system must be capable of acquiring both the face and the iris of the subject of interest with sufficient resolution. The required focal length of the lens 45 can be calculated based on the required magnification such that, for a given subject standoff distance from lens 45, reasonable resolution across the iris can be obtained. For this system, a resolution of 200 pixels across the iris is sufficient for the recognition module to be able to make an identity determination. As the typical human iris has a diameter of approximately 12 mm, the magnification required may be approximated by the equation:

$$M = \frac{h_i}{h_o} = \frac{1.29}{12} = 0.1075 \qquad \text{Eq. 1}$$

Where $h_i$ is the required image size (200 pixels) and $h_o$ is the average size of a human iris (12 mm). To convert the required image size from pixels to millimeters, we can multiply by the size of a pixel, as such: $200 \times (6.45 \times 10^{-3})$ mm=1.29 mm. The size of the sensor pixel is obtained from the specifications of camera 30 used in the system, described below, and will vary if other hardware is chosen.

To determine the required focal length of lens 45, f, the following equation can be used:

$$f = \frac{M \times D}{1+M} = \frac{0.1075 \times 8000}{1.1075} = 776 \text{ mm} \qquad \text{Eq. 2}$$

where D is the distance from the front of lens 45 to the subject (the subject stand-off distance). For a stand-off distance of 8 m, a 776 mm lens is therefore required. In the preferred embodiment of the system, a Canon 800 mm lens has been chosen, but any lens capable of focusing to the required focal length would be acceptable. It should be noted that, for values of D greater than 8 m, a focal length greater than 776 mm would be required and would necessitate the use of focal length extenders. However, the use of such extenders is known to increase aberrations during image acquisition, and, as such, their use for this application depends on the quality of optics used in the extender. For distances in the range of 4 m-8 m, no extender is used. For distances in the range of 6 m-11 m version, a 1.4× extender manufactured by Canon may be used. The use of extenders with greater power than this tends to decrease the quality of the acquired image.

Figure 3:
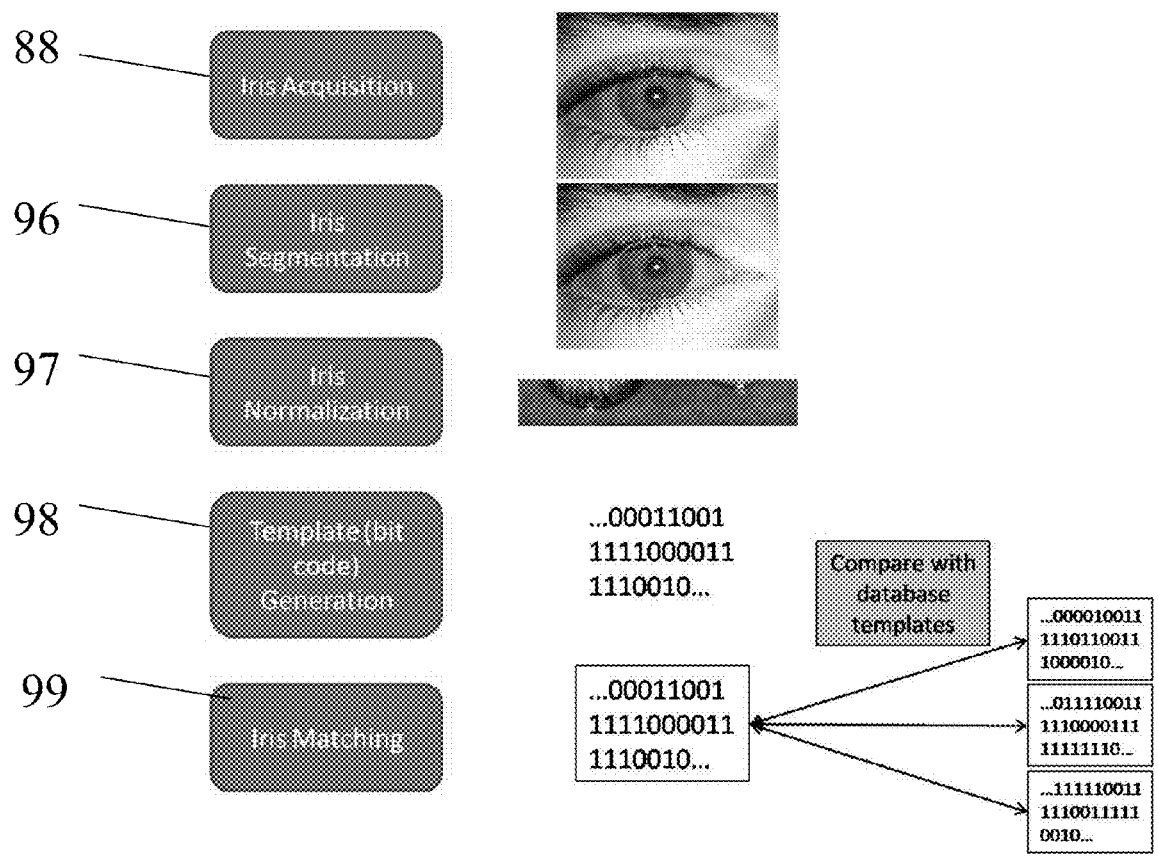
FIG. 3 is a block diagram showing software components of the system used to process the iris images.
Figure 4:
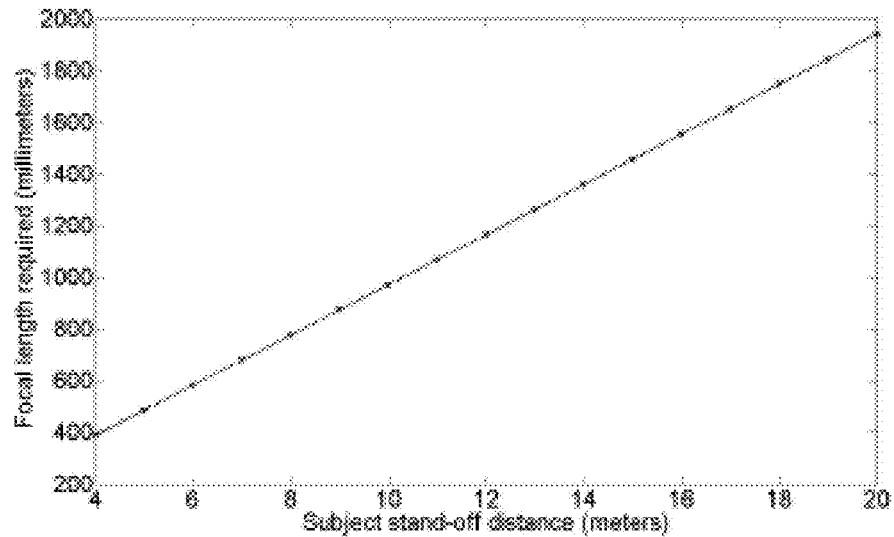
FIG. 4. is a graph showing variations in focal length required for a range of subject stand-off distances to obtain a 200 pixel resolution for iris scans FIG. 5. is a graph showing variations in resolution (in pixels) over a range of stand-off distances when an 800 mm lens is used for imaging.
Figure 5:
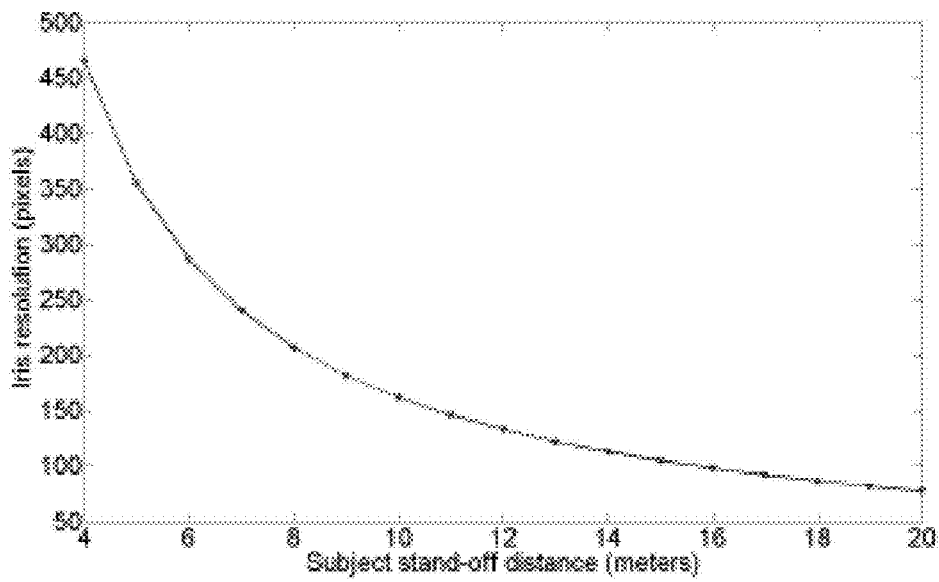

FIG. 3 is a graph showing the variation in focal length with subject stand-off distance to obtain a 200 pixel resolution across an average iris, using Eq. 2. FIG. 4 is a graph showing the pixel resolution obtained at various distances using the 800 mm lens.

In the preferred embodiment of the invention, a high resolution scanner (camera) 30 with a very high pixel count is used. The Canon 5D Mark II is a suitable camera, but other cameras having an equivalent pixel count could also be used. The higher pixel count ensures that both the face and iris of the subject may be acquired with the required resolution, from a single captured frame. Camera 30 has a full frame sensor with dimensions of 36 mm×24 mm. As was shown previously, a lens having a focal length of 800 mm is satisfactory for the imaging requirements. Rearranging the terms in Eq. 2, we see that for a value of f=800 mm and stand-off distance of D=8 m, the magnification $$M = \frac{f}{D-f} = 0.11 \qquad \text{Eq. 3}$$

From this value, we can determine the field of view at 8 m for the given sensor size to be 32.4 cm×21.6 cm. However at D=4 m, the field of view is calculated to be 14.4 cm, ×9.6 cm. Due to the decrease in the longer dimension of the field of view, at distances closer than 4 m it becomes difficult to accommodate the entire face within a frame. As mentioned previously, it is desirable to be able to acquire enrollment quality iris images, with a pixel resolution of at least 200 pixels, using this device. Due to this constraint, as well as constraints on focal length used and the diminishing field of view at shorter stand-off distances, the optimal range for capturing the images is between 4 m and 8 m, without a focal length extender. With the 1.4× extender previously mentioned, the capture range increases to 6 m-11 m. If the pixel resolution requirements across the iris are relaxed, then images may be captured from greater distances using the setup described (see FIG. 4). The camera is preferably operated in the 'portrait' mode so that the longer dimension of the field of view corresponds to the length of the face of the subjects.

Figure 2:
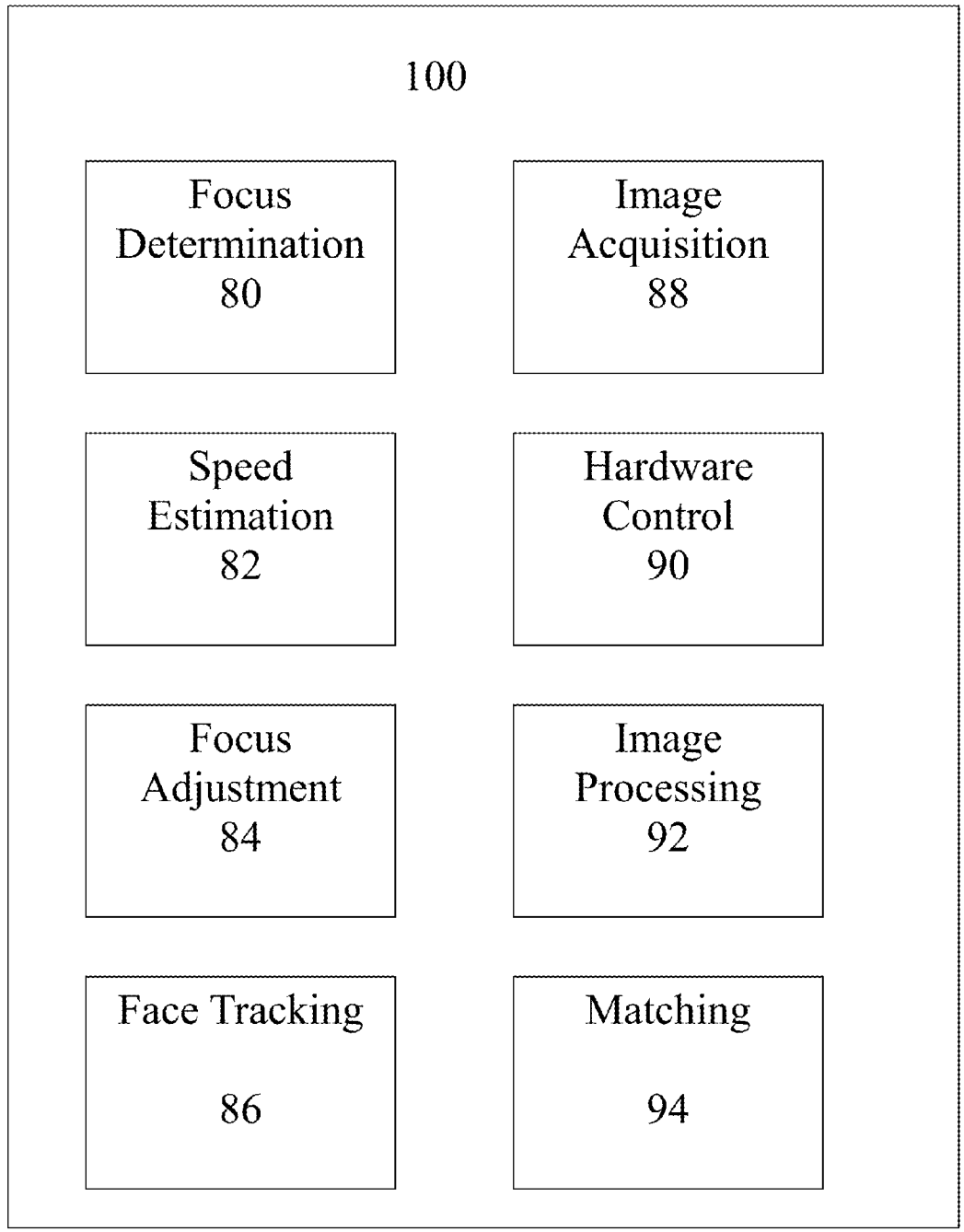
FIG. 2 is a block diagram of the software components of the system.

To ensure good focus across all acquired images, a software-driven auto-focusing device 40 is used. The Canon Application Programming Interface (API) does not provide the necessary control over the auto-focus hardware within the camera body. As a result, in the preferred embodiment of the invention, a focus adjuster 40 is used to provide control over lens 45, independent of the camera body. An existing RS232 lens control module manufactured by Birger™ Engineering was modified to fit the needs of the system. The focus adjustment routines 84, shown as part of software 100 in FIG. 2, developed for the purpose of this invention include a focus measure function 80 based on spatial gradients. The focus measure 80 over the frame is given by the mean of the magnitude of the two-dimensional gradient at every pixel position within the frame. If, $f_{measure}$ represents the focus measure over the frame I of dimension m×n, then:

$$f_{measure} = \frac{1}{mn}\sum_{i=1}^{m}\sum_{j=1}^{n}|\nabla I_{ij}| \quad \text{Eq. 4}$$

where, $$|\nabla I_{i,j}| = \sqrt{\left(\frac{\delta I i, j}{\delta y}\right)^2} + \sqrt{\left(\frac{\delta I i, j}{\delta y}\right)^2} \quad \text{Eq. 5}$$

is the pixel intensity at (i, j).

In the case of a mobile subject, the system estimates the speed of the subject, using speed estimation module 82, as the subject walks towards the system. For this purpose, the subject is assumed to be moving at a constant velocity.

Figure 7:
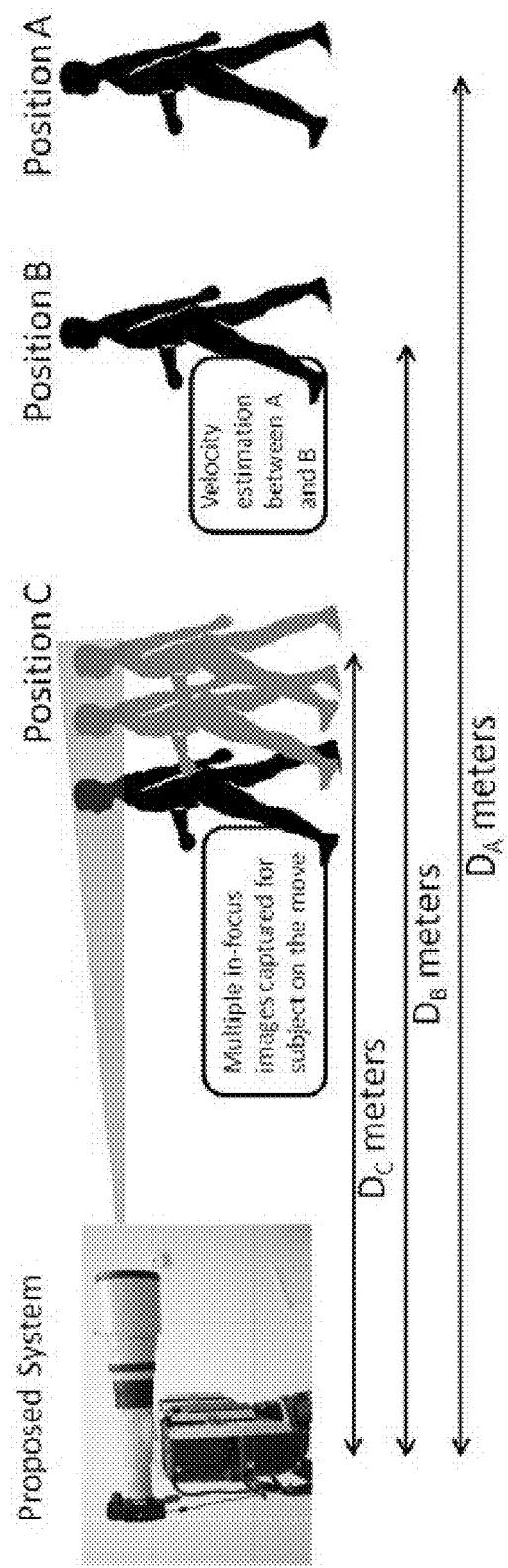
FIG. 7 shows the various checkpoints used by the system for determining the sped of the subject and for the actual imaging of the face and iris of the subject.

Referring now to FIG. 7, the focus position of the system is set at position A at a distance $D_A$ from the system using focus adjustment module 84 and focus adjuster 40, upon initialization. As the subject approaches the system and crosses position A, the system starts a timer and moves the focus position to position B at a distance $D_B$. Once the subject crosses position B, and due to the constant velocity assumption, the speed of the subject can be estimated and the time when the subject will pass position C can be predicted. This information is used to track the subject's focus with time.

To determine when the subject crosses both position A and position B, a focus determination algorithm 80, previously described, is used. With the focal length of the lens set at any arbitrary position (in our case position A or position B), it is assumed that the subject crosses that position when the focusing determination algorithm 80 returns a value which indicates optimum focus.

To perform focus tracking effectively, the position of the subject is mapped onto a stepper motor focus encoder value within the Birger™ mount. FIG. 4 shows a graph of distance from system in meters vs. encoder steps. These values were determined experimentally and would naturally be different for embodiments using different hardware. For purposes of explanation, from this graph, it can be seen that for very small variations in distance, the relationship between distance and focus encoder position can be assumed to be linear. For purposes of this invention, fine focus adjustment may be used to compensate for motion as the subject crosses position C.

In an alternate embodiment of the invention, a laser range finder 80 may be used to provide 'real time' estimates of the focus position as the subject moves towards the system. In this embodiment, instead of using the focus measure to determine the subject position, laser range finder 80 can be used to determine where the subject is and thus estimate the velocity of the subject. Using this velocity information, combined with the subject position estimation provided by laser range finder 80, the system can capture images as the subject moves towards the system.

Once the speed has been estimated, the focal length of the lens is moved to position C where an iris image with the desired resolution may be obtained. Given the required resolution (in pixels), the image size $h_i$ may be estimated as in Eq. 1. Because we are using a lens with focal length f=800 mm, the maximum distance from the system $D_c$ at which an iris of this resolution can be acquired, may be obtained from Eqs. 1 and 2 as, $$D_C = \frac{f(h_0 + h_i)}{h_i} \quad \text{Eq. 6}$$

Once this is known, a set of images is continuously captured while the subject moves past position C, using image acquisition module 88. This 'burst capture' mode may include a fine focus tracking procedure, or may simply assume that a certain number of in-focus images will be captured with the focus of the lens fixed at position C, without making fine adjustments to the focus throughout the burst of image captures. Camera 30 is controlled by hardware control module 90

In an alternate embodiment of the invention, laser range finder 80 can be used to estimate user position with respect to the system. This approach coupled with our focus measure strategy significantly reduces the lens focus adjustment time, thus reducing the time that a subject remains in the required position. The focus estimation is achieved by using laser range finder 80 to returns a "coarse" estimation of the subject distance from system. This distance is referred to as "coarse", because the subject's body will appear to be well focused, but when zooming into the eye, it can be observed that a "fine" focus must be performed to acquire enrollment quality iris images. To perform the "fine" focus, the vicinity of the estimated focus distance is searched using the spatial gradient algorithm previously mentioned. Once the "fine" focus is performed, control passes to the iris acquisition module of the software. Laser range finder 80 significantly reduces the overall time required to achieve initial focus, by providing us a coarse estimate of the distance to the subject as quickly as possible.

Figure 6:
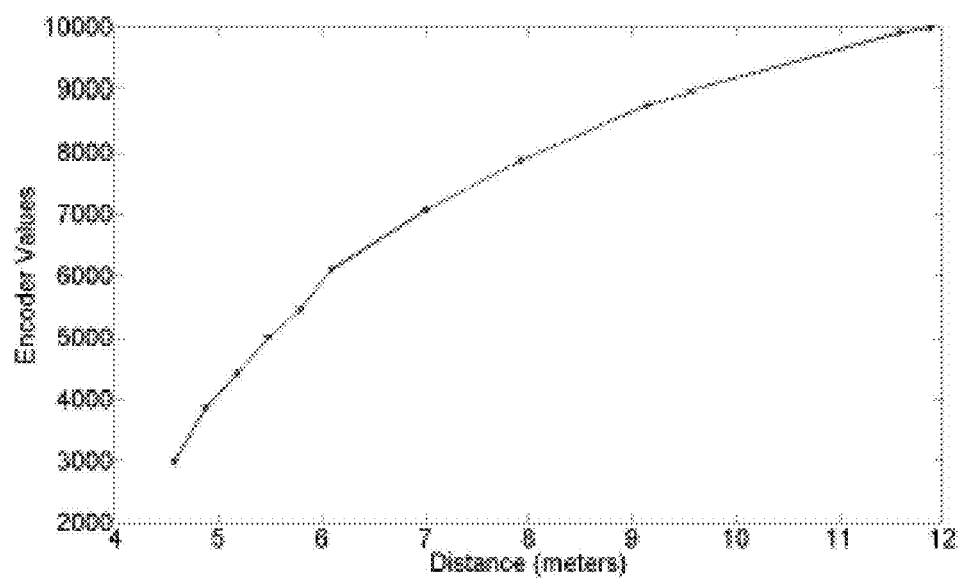
FIG. 6 is a graph showing the relationship between focus encoder steps and over a range of stand-off distances.

Along with the estimated subject speed, this procedure also requires knowledge of the minimum time interval between two consecutive shutter activations of the imaging device. For the embodiment employing the Canon 5D Mark II this value is 5 frames per second. Given this, the minimum time interval in the 'burst mode' during which no images can be acquired (i.e., between two shutter activations) is 0.2 seconds. Hence, the subject distance from system, $D_{i+1}$ for each consecutive frame may be determined as, $$D_{i+1} = D_1 + 0.2\left(\frac{D_B - D_A}{t_B - t_A}\right) \quad \text{Eq. 7}$$

$$i = 1, 2, \ldots, N$$

where $D_1 = D_C$. The linear mapping scheme mentioned earlier and shown in FIG. 6 enables the conversion of this value into an equivalent focus encoder step at each consecutive frame.

In addition to the system components that have been detailed above, another essential component is the face tracking component 86. This is necessary to keep the face of the subject within the frame of camera 30. A wide angle scene camera tracks 70 the subject during the entire acquisition process from position A, until the multiple high resolution images are captured at position C. The tracking is achieved by means of a standard Kalman filter implementation well known in the art. The face tracker directs the motion of pan/tilt mechanism 20 via hardware control module 90 to keep the face of the subject centered in the frame of the high resolution sensor 30 as the subject moves.

As is well known in the art, in the irises of most subjects, much of the incident light in the visible spectrum is absorbed and some is reflected off of the cornea. However, most of the light in the near infra-red and infra-red wavelengths, incident on the iris, is reflected back and can be imaged by sensor 30. It is therefore well known in the art that imaging the iris in the infra-red or near infra-red wavelengths provides most of the discriminating information for an iris recognition system. For illumination, in the preferred embodiment of the invention, the system uses a set of four infra-red (IR) illumination panels 50, such as the one seen in FIG. 8a, to illuminate the iris over the entire acquisition range. One advantage of the use of such panels along with an iris recognition system is that it uses continuous IR output as against a pulsed output that is conventionally used with iris acquisition systems.

A pulsed IR source lets the device emit a larger amount of energy than is recommended for eye safety. Due to the pulsing nature of the output, the net energy incident on the eye can be kept within eye safety limits. However, use of a pulse IR source requires that the capture interval in the camera be matched with the pulsing frequency, which cannot always be accomplished with commercial off the shelf equipment.

As the use of a standard, commercially available camera to acquire face and iris images is desirable for cost reasons, a continuous power output was required. As such, the system uses a set of 'continuously on' IR LEDs, each of which is eye safe. By stacking a large number of such LEDs together, we ensure that there is enough IR illumination incident on the subject for iris acquisition and recognition. At the same time, since each LED is imaged onto a different spot on the retina of the subject, the energy density at each spot remains below eye safety limits, allowing the entire illumination setup to adhere to eye safety limits.

Figure 8:
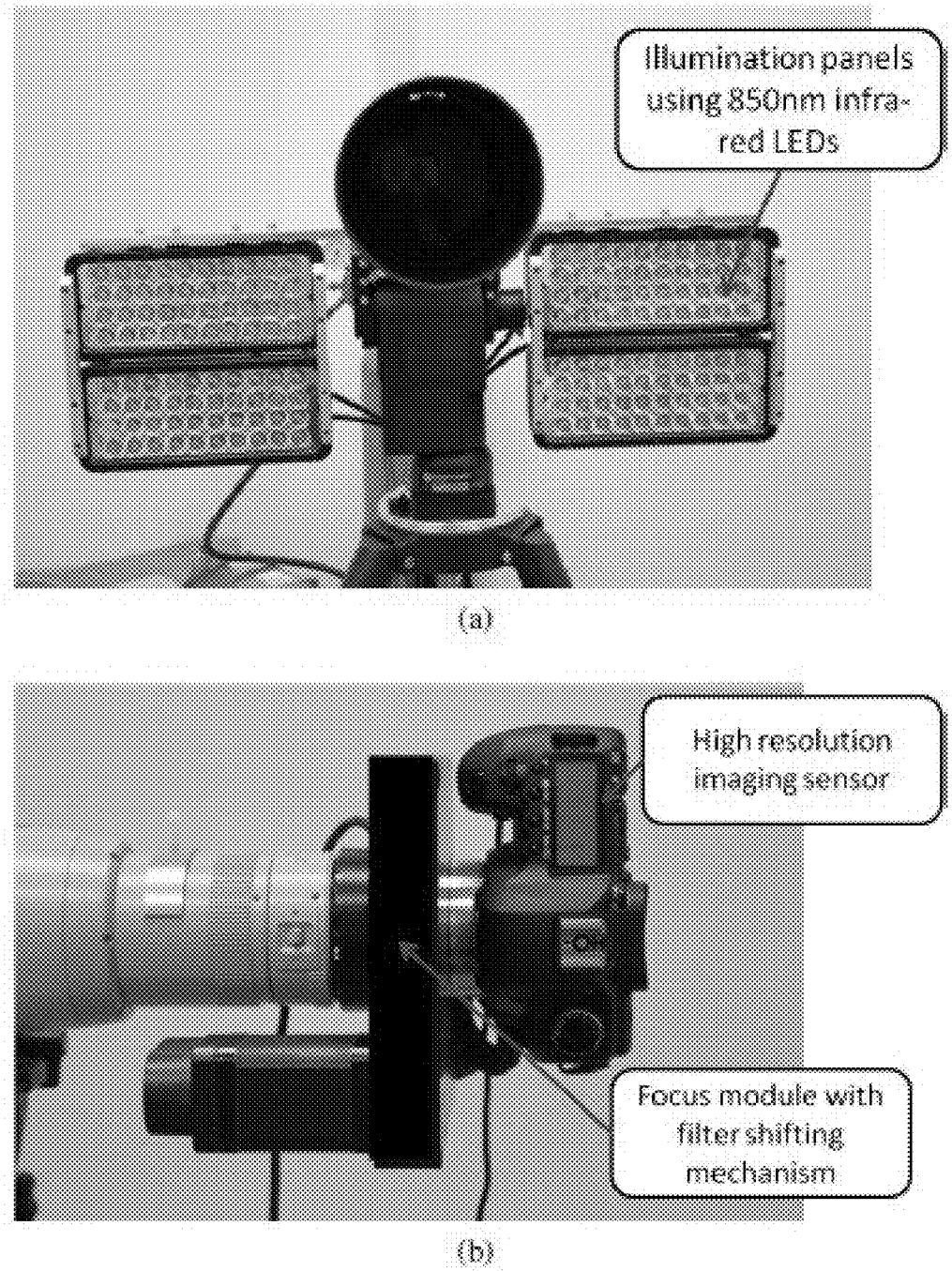
FIG. 8(*a*) shows a front plan view of an implementation of the system of the present invention, showing hardware components, while FIG. 8(*b*) shows the same system from a side plan view.

The system may optionally be fitted with a filter wheel 60 to switch between the visible spectrum and the infra-red spectrum as required. For instance, for face recognition purposes, it is better to use visible wavelengths of light, while for iris imaging, infra-red wavelengths are preferred. For the visible block filter, an 850 mm band-pass filter can be used as most of the iris texture is clearly discernible when imaged around this wavelength. FIGS. 8(a-b) show an exemplary embodiment of the system built using the components described herein.

Once iris images have been captured, they are processed by image processing module 92. The iris image is segmented at box 96 and normalized at box 97 by processes well known in the art. The image is then prepared for image matching by matching module 94. The pattern is encoded into a bit code at box 97. The bit code can then be matched, at box 99, against database 70 of known bit codes for identified individuals to verify the identity of the subject. FIG. 3 shows this process.

Experimental results of high resolution face and eye images captured using the described system will now be presented, for both stationary and moving subjects.

Figure 9:
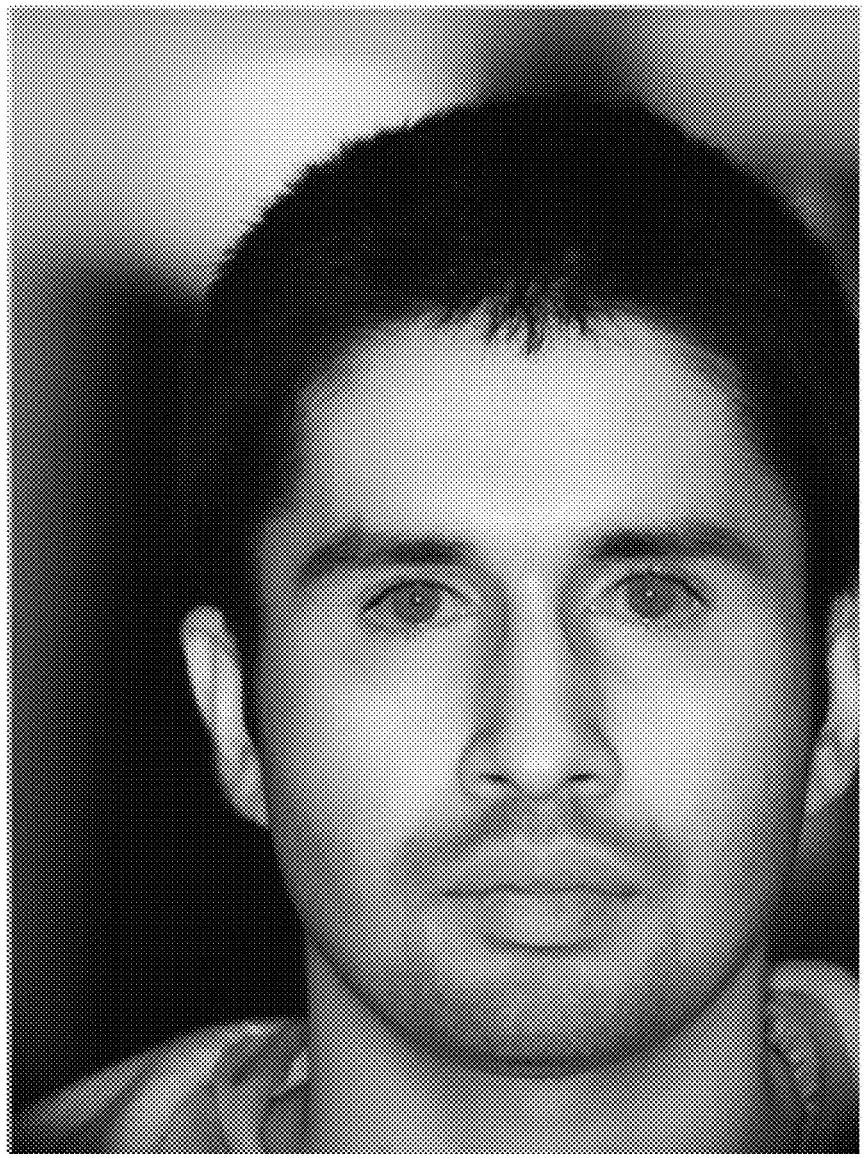
FIG. 9 shows an example of a whole-face image captured at a stand-off distance of 7 m.
Figure 10:
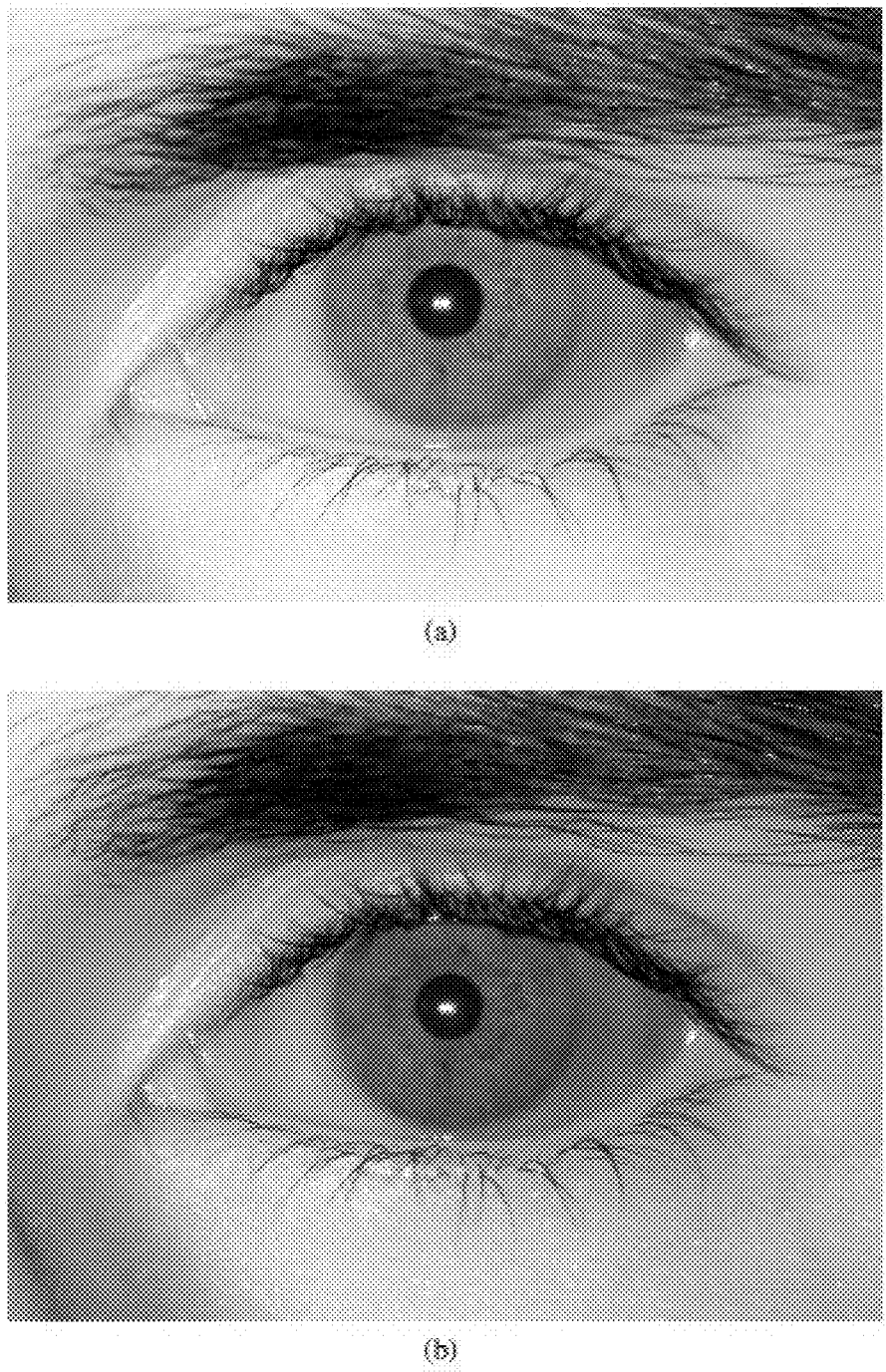
FIGS. 10(*a-b*) show images of the iris of the face of FIG. 9 at stand-off distances of 6 m and 7 m respectively.

A first set of experiments with this system involve a simple focus estimation and acquisition of eye images when a subject stands at an arbitrary location in front of the system. During this experiment, the subject is tracked and when the subject is still, the focus adjustment module 84 sets the focus position of the lens to an appropriate value. FIG. 9 shows an example of a face that was captured during this experiment and FIGS. 10(a) and 10(b) show images of the subject's eye cropped out from the face at stand-off distances of 6 m and 7 m respectively. When compared to images acquired from known, prior art systems, it is seen that enrollment quality iris images can be achieved from a much greater stand-off distances than with the prior art systems.

Figure 11:
FIGS. 11(*a-b*) show images from separate capture sessions at a stand-off distance of 7 m as the subject walks through the capture volume at speeds of 3 m/s and 6 m/s respectively.
Figure 11:
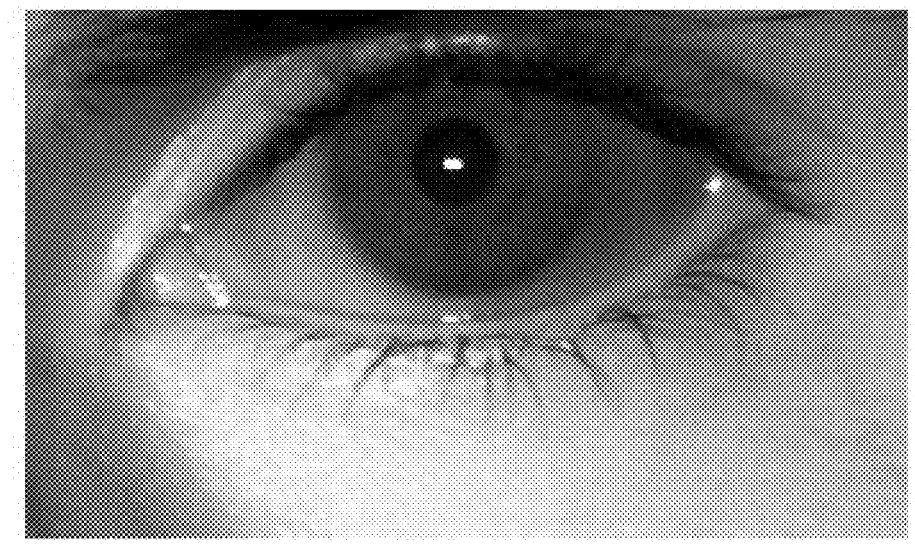

A second set of experiments was performed on mobile subjects. The images were acquired when the focus position of the lens was tracked automatically based on estimated subject speed, as previously described. FIGS. 11(a) and 11(b) show iris images that were captured from a subject moving at speeds of between 0.3 m/s and 0.6 m/s. From analysis of experimental results, it was found that approximately 40% of the images acquired as the subject passed through the capture volume at position C were in-focus. This can be determined using the same focus algorithm 80 used during the speed estimation process. As such, in the preferred embodiment, 10 images are captured as the subject passes position C. The remainder of the images are not suitable for iris capture because of erroneous focus settings due to minor variations in the speed of the subject, and motion blur, which is to be expected in a real world setting. The requirement of 10 images is not a drawback, as the entire acquisition process when the subject is passing through position C takes less than two seconds.

While the invention has been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the following claims. Any hardware embodiment using the method of the present invention is considered to be within the scope of the invention.

We claim:

1. A system for acquiring images of the human iris comprising:
   a. an image sensor;
   b. a lens having a controllable focal length;
   c. a pan/tilt mechanism upon which said sensor and said lens are mounted; and
   d. a computer, programmed with software for performing the functions of:
      setting the focal length of said lens to a first predetermined point representing a distance from said system;
      detecting when a subject crosses said first predetermined point;
      setting the focal length of said lens to a second predetermined point representing a second distance from said system, said second distance being closer to said system than said first distance;
      detecting when a subject crosses said second predetermined point;
      estimating the speed of a subject based on the known distance between said first and said second predetermined points and the elapsed time for the subject to travel from said first predetermined point to said second predetermined point;
      controlling said pan/tilt mechanism to keep the face of the subject with the frame of said image sensor;
      acquiring images of the iris of the eye of the subject; and
      matching said image against a database of images of the irises of known subjects.

2. The system of claim 1 wherein said detecting steps detect when a subject crosses said first or said second predetermined points by determining when the image of the subject is in focus.

3. The system of claim 2 wherein said determination of whether or not an image is in focus is made using a spatial gradient function.

4. The system of claim 1 wherein said speed estimation function further comprises the functions of:
   detecting when a subject cross a first predetermined point using a laser range finder;
   detecting when a subject crosses a second predetermined point using a laser range finder; and calculating the speed of the subject based on the known distance between said first and said second predetermined points and the elapsed time for the subject to travel from said first predetermined point to said second predetermined point.

5. The system of claim 1 wherein said acquiring step further comprises the functions of:
   estimating when the subject will cross a third predetermined point based on the estimation of the speed of the subject;
   setting the focal length of said lens to said third predetermined point; and
   capturing one or more images of the face of the subject as the subject crosses said third predetermined point.

6. The system of claim 5 further comprising the function of making changes to the focal length of said lens as said one or more images are being captured, based on the estimated speed of the subject.

7. The method of claim 6 wherein said changes to the focal length are based on
   a coarse estimation of distance to said subject based on the use of a laser range finder; and
   a fine focusing based on an algorithmic determination of focus on the iris of said subject.

8. The system of claim 6 wherein said images of the eye of said subject is cropped from one or more of said acquired images.

9. The system of claim 1 further comprising a source of infra-red illumination, wherein said acquired images are captured under infra-red illumination.

10. The system of claim 9 wherein said source of infrared illumination in consists of one or more arrays of infra-red LEDs, each of which individually emits energy that is safe for the eye of a subject.

11. The system of claim 1 further comprising a filter wheel, to select filters to allow the selective capture of said acquired images under natural or infra-red illumination.

12. A method of acquiring images of the human iris comprising:
   estimating the speed of a subject as the subject passes between first and second predetermined points;
   setting the focal length of a lens connected to a scanner to a third predetermined point;
   predicting when said subject will cross said third predetermined point based on said estimated speed of the subject;
   acquiring one or more images of the face of the subject using said scanner and said lens as the subject passes said third predetermined point; and
   extracting images or one or both of the irises of said subject from said acquired images.

13. The method of claim 12 wherein said step of estimating the speed of the subject further comprises the steps of:
   setting the focal length of said lens to a first predetermined point;
   detecting when a subject crosses said first predetermined point;
   setting the focal length of said lens to a second predetermined point, said second predetermined point being closer to said lens than said first predetermined point;
   detecting when a subject crosses said second predetermined point; and
   calculating the speed of the subject based on the known distance between said first and said second predetermined points and the elapsed time for the subject to travel from said first predetermined point to said second predetermined point.

14. The method of claim 13 wherein said detecting step detects when a subject crosses said first or said second predetermined points by determining when the image of the subject is in focus.

15. The method of claim 14 wherein said determination of whether or not an image is in focus is made using a spatial gradient function.

16. The method of claim 12 wherein said speed estimation function further comprises the functions of:
   detecting when a subject cross a first predetermined point using a laser range finder;
   detecting when a subject crosses a second predetermined point using a laser range finder; and
   calculating the speed of the subject based on the known distance between said first and said second predetermined points and the elapsed time for the subject to travel from said first predetermined point to said second predetermined point.

17. The method of claim 12 wherein said scanner and said lens are mounted on a pan/tilt mechanism, further comprising the step of:
   controlling said pan/tilt mechanism to keep the face of the subject in the frame of the scanner as the subject travels to said third predetermined point.

18. The method of claim 12 further comprising the step of illuminating the subject with light in the infra-red or near infra-red wavelengths as said images are acquired.

19. The method of claim 12 wherein said step of acquiring one or more images further comprises the step of controlling said scanner to capture multiple images during a predetermine period of time.

20. The method of claim 12 further comprising the step of making changes to the focal length of said lens as said one or more images are being captured, based on the estimated speed of the subject and the time between image captures.

21. The method of claim 20 wherein said changes to the focal length are based on
   a coarse estimation of distance to said subject based on the use of a laser range finder; and
   a fine focusing based on an algorithmic determination of focus on the iris if said subject.

22. A system for acquiring images of the human iris comprising:
   a. an image sensor;
   b. a lens having a controllable focal length;
   c. a pan/tilt mechanism upon which said sensor and said lens are mounted; and
   d. a computer, programmed with software for performing the functions of:
      determining the position of a subject with respect to said system;
      controlling said pan/tilt mechanism to keep the face of said subject with the frame of said image sensor;
      setting the focal length of said lens to focus the facial region of said subject using spatial gradients measured by said image sensor;
      locating the eye region of said subject using spatial features extracted from the frame of said image sensor;
      extracting relevant identifying information from the iris region of said subject using said image sensor; and
      matching said identifying information against a database of identifying information of known subjects.

* * * * *